May 16, 1939.  S. C. ATKINS ET AL  2,158,558

HYDRAULIC SERVO SYSTEM

Filed May 2, 1936

INVENTORS
SAMUEL C. ATKINS
HAROLD E. SCOFIELD
BY Herbert H. Thompson
THEIR ATTORNEY.

Patented May 16, 1939

2,158,558

UNITED STATES PATENT OFFICE 2,158,558

HYDRAULIC SERVO SYSTEM

Samuel C. Atkins, Montvale, and Harold E. Scofield, East Orange, N. J., assignors to Sperry Gyroscope Company, Inc., Brooklyn, N. Y., a corporation of New York Application May 2, 1936, Serial No. 77,648

6 Claims. (Cl. 137—78)

This invention relates, generally, to a novel hydraulic or hydro-pneumatic servo system, such as employed in connection with automatic pilots for aircraft, the said system having a fluid reservoir or sump positioned on a level with or higher than the control valve or valves of the system.

In installing automatic pilots, such as the type disclosed in Patent No. 1,992,970 of Elmer A. Sperry, Jr. et al., it is often necessary to install the reservoir or sump substantially level with or higher than the master control valves of the automatic pilot. In such case, it is difficult or impossible to properly drain the control valves so as to return leakage fluid therefrom to the reservoir or sump. A direct connection between the control valves and sump or inlet to the system pump, including a check valve, is not satisfactory, because air is thereby drawn into the system, rendering the operation of the same unsatisfactory and unreliable. It is therefore essential that the leakage fluid, such as oil, be returned from the control valves to the sump or intake side of the system without the possibility of air entering the system.

The principal object of the present invention is to provide a novel servo system including a drain trap especially suitable for use in connection with automatic pilots of the hydropneumatic type, such as disclosed in the above identified patent, which drain trap is suitable for returning the leakage fluid from the control valves to the reservoir or sump of the system even though the latter is at the same or a higher elevation than the control valves.

Another object of the present invention lies in the provision of a novel servo system including a drain trap of the above character, having a float chamber provided with a float controlled valve therein for automatically regulating the admission of leakage fluid to the inlet side of the system pump, said valve being dependent in its operation upon the pump suction acting on said valve in addition to the fluid level in the float chamber.

Other objects and advantages will become apparent from the specification, taken in connection with the accompanying drawing, wherein one embodiment of the invention is illustrated.

In the drawing.

Similar characters of reference are used in all of the above figures to indicate corresponding parts.

Figure 2:
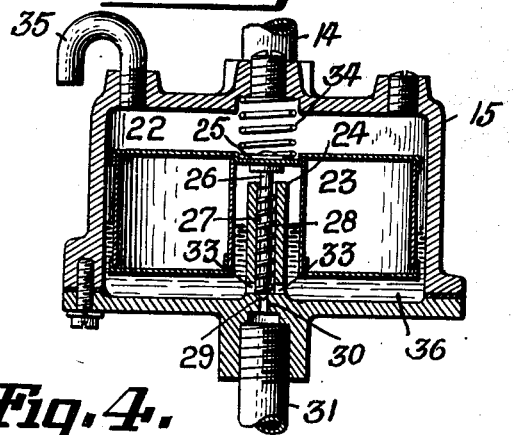
Fig. 2 is a vertical sectional view of the structure of Fig. 1.
Figure 1:
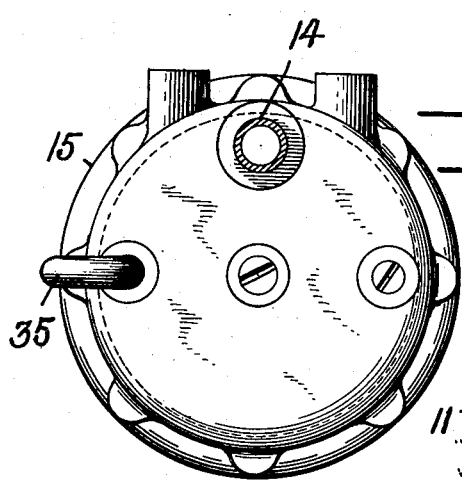
Fig. 1 is a plan view of the novel drain trap of this invention.
Figure 4:
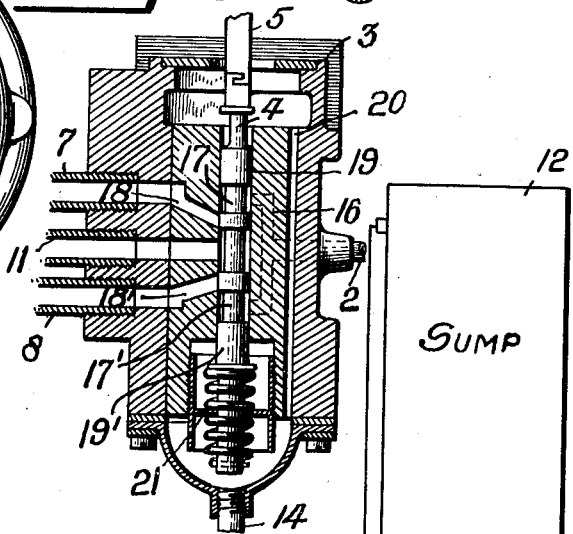
Fig. 4 is an enlarged sectional view of one of the master control valves in the system.
Figure 3:
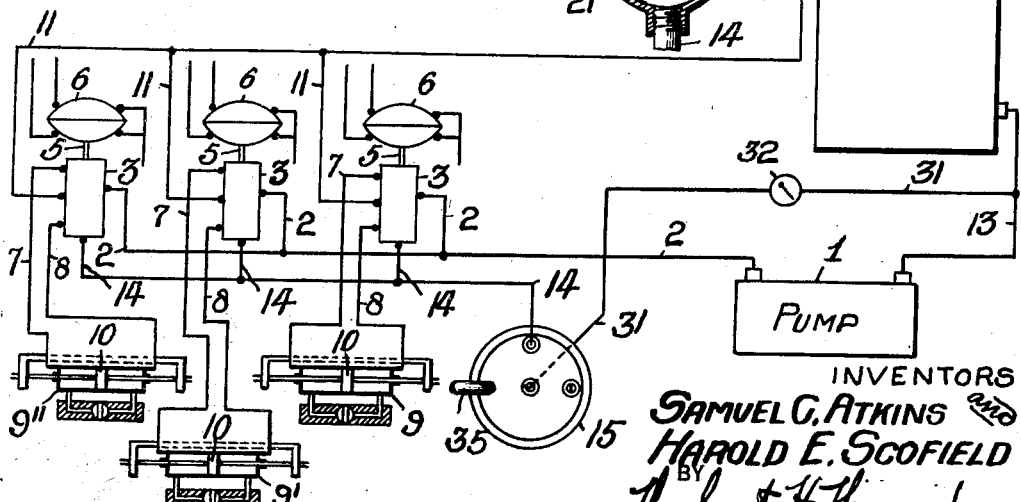
Fig. 3 is a schematic view illustrating the use of the drain trap in connection with a hydropneumatic automatic pilot.

Referring now to said drawing, the reference numeral 1 designates a hydraulic pump for supplying pressure fluid, such as oil, through piping 2 to the master control valves 3 of the hydropneumatic automatic pilot. The valves 3, as illustrated in Fig. 4, have piston valve elements 4 therein, connected to the stems 5 of air actuated diaphragms contained within casings 6, the said diaphragms being pneumatically controlled from the gyroscopic control means of the automatic pilot in the manner fully disclosed and claimed in the above identified patent. Movements of the diaphragms within casings 6 serve to effect control of the operation of the piston valves 4, thereby controlling the flow of pressure fluid from piping 2 to pipes 7 and 8 leading from the master control valves to the power cylinders 9, 9' and 9''. These power cylinders have operating pistons 10 therein, respectively connected to the respective control surfaces of the aircraft for actuating the latter. The master control valves 3 have return pipe lines 11 leading to the reservoir or sump 12, which may be at a higher level than the valves 3, said reservoir 12 being connected by supply piping 13 to the intake side of the pump 1. The structure so far described is fully disclosed in the above identified patent.

According to the preferred arrangement, in order to provide for the return of the leakage fluid to the intake side of the pump 1, the master control valves 3 are provided with drain outlets connected to piping 14 leading to the novel drain trap 15 of this invention, that is positioned below the control valves. The pressure fluid supplied from pipe 2 through passage 16 of each control valve passes around reduced portions 17 and 17' of valve element 4 before entering the passages 18 and 18', leading to the pipes 7 and 8. Some of this pressure fluid escapes past the enlarged end portions 19 and 19' of the piston valve element 4 and is allowed to drain into the piping 14. A small passage 20 enables leakage oil or fluid escaping past the end portion 19 at the top of the piston valve element to run down and enter the piping 14, whereas oil or fluid leaking past portion 19' of the valve element will flow downwardly along this element and past centering plug 21 into the piping 14. Piping 14 conducts this leakage fluid to the float chamber 22 constituting the hollow interior of the drain trap housing.

A float 23, somewhat similar to a carburetor float, is contained within the float chamber 22 and is illustrated as of annular shape. Float 23 surrounds a tubular guide projection 24 extending upwardly from the central portion of the bottom of the drain trap casing. Float 23 is provided with an upper central partition 25 to which is attached the upper end of a valve stem 26, which valve stem projects downwardly into the hollow cylindrical interior 27 of the tubular guide projection 24. Valve stem 26 is provided with a helical projection or thread 28 that has a sliding fit within the interior 27 of the tubular guide projection 24. Preferably, the successive convolutions or threads of the helical projection 28 are spaced an appreciable distance apart so as to allow ready entrance of the leakage oil around the stem 26 and between the successive convolutions of the helical projection 28.

The lower portion of the stem 26 is conically shaped at 29 to form a valve for cooperating with a valve seat surrounding the upper portion of a discharge passage 30 provided in the bottom of the drain trap housing. The passage 30 communicates with a pipe 31 leading to the supply piping 13, and hence to the reservoir 12 and the pump 1. A check valve 32 is shown provided in the pipe 31 so as to allow the flow of fluid from the drain trap to supply piping 13, while preventing the reverse flow of such fluid. The lower portion of the tubular projection 24 is provided with a transverse passage 33 just above the seat of valve 29, whereby fluid may flow from the float chamber to the valve 29 and into passage 30 when this valve is open. Fluid is also supplied by passage 33 to the spaces between the convolutions of the helical projection 28 of the valve stem. A light coil spring 34 is shown interposed between the partition 25 of the float 23 and the under surface of the top of the drain trap casing, said spring serving to urge valve 29 downwardly toward its seat. The top of the drain trap is provided with an air vent 35.

In use, any leakage fluid, escaping past the end portions 19 and 19' of the master control valve pistons elements 4, flows into piping 14 and thence into the float chamber 22 of the drain trap. When the level of the leakage fluid 36 within float chamber 22 rises to such a height as to buoy up the float 23 to such an extent as to overcome not only the weight thereof but also the tension of spring 34 and the suction effect exerted by the pump 1 through pipe 31 upon the valve 29, the float will rise, thereby opening discharge passage 30 and permitting leakage fluid to flow out of the float chamber through transverse passage 33, passage 30, and into pipe 31, whence it flows into the pipe 13 preparatory to entering the pump 1. As the float 23 rises, the inertia of the oil or fluid surrounding the valve stem 26 within tubular guide projection 24 acts upon the helical thread or projection 28 to effect a slight turning of the float 23.

As the leakage fluid flows out of the float chamber, the float 23 will descend and, in so descending, the inertia of the oil surrounding the valve stem 26 will again serve to continue the slight turning of the float 23 so that by the time valve 29 is again seated, the same has turned through an appreciable angle, thereby preventing the accumulation of dirt or grit upon the valve seat, which would tend to cause leakage of the valve. The valve 29 closes before all the oil has been removed from the float chamber, so that the inlet to pipe 31 is thus effectively sealed by the remaining oil against the admission of air thereto, whereby the system is retained in condition free from occluded air, which is absolutely essential for the proper functioning of the automatic pilot apparatus.

It will be noted that should the valve 29 open at a time when the pump 1 is not exerting a suction effect in pipe 31 for any reason, reverse flow of oil from the sump or reservoir 12 into drain trap 15 is prevented by the closing of check valve 32. Thus, it will be seen that regardless of how high the sump or reservoir 12 is positioned with respect to the drain trap 15, this trap will always discharge its contained leakage fluid into the pipe 31 to be supplied through pipe 13 to pump 1, that serves to return such leakage fluid to the control valve 3, and thence through power cylinders 9, 9' and 9" back to the reservoir 12, thereby conserving the leakage fluid. Whenever the level of leakage fluid has reached a predetermined point within the drain trap chamber, the continuous suction of the pump serves to effect the removal of the leakage fluid and the return thereof to the system regardless of the height of the trap chamber with respect to that of the reservoir or sump.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described our invention, what we claim and desire to secure by Letters Patent is:

1. In a hydraulic servo system, in combination, a fluid pump, control valve means, piping connecting said pump and control valve means whereby the latter is connected to be supplied with pressure fluid from said pump, a reservoir on a level with or higher than said control valve means, additional piping connecting said reservoir to said pump and to said valve means, whereby said reservoir receives the discharge fluid from said valve means for supplying the same later to said pump, and a drain trap below said control valve means separately connected for receiving leakage fluid from said valve means and for supplying such fluid to said pump, said drain trap comprising a float chamber for receiving the leakage fluid, a float within said chamber, and valve means connected to said float for regulating the flow of leakage fluid from said float chamber to said pump.

2. In a hydraulic servo system, in combination, a fluid pump, control valve means, piping connecting said pump and control valve means whereby the latter is connected to be supplied with pressure fluid from said pump, a reservoir on a level with or higher than said control valve means, additional piping connecting said reservoir to said pump and to said valve means, whereby said reservoir receives the discharge fluid from said valve means for supplying the same to said pump, and a drain trap below said control valve means connected for receiving leakage fluid from said valve means and also connected to said additional piping for supplying such fluid to said pump, said drain trap comprising a float chamber for receiving the leakage fluid, said float chamber having a discharge opening providing a valve seat, a float within said chamber, and a valve carried by said float for cooperating with said valve seat, said valve being subject to the suction of said pump and serving to regulate the flow of leakage fluid from said float chamber to said pump.

3. In a hydraulic servo system, in combination, a fluid pump, control valve means connected to be supplied with pressure fluid from said pump, a reservoir on a level with or higher than said control valve means and connected for receiving the normal discharge fluid from said valve means and for supplying the same to said pump, and a drain trap below said control valve means connected for receiving leakage fluid from said valve means by gravity flow and for supplying such fluid directly to said pump, said drain trap comprising a float chamber for receiving the leakage fluid, said float chamber having a discharge opening providing a valve seat, a float within said chamber, a valve carried by said float for cooperating with said valve seat, said valve being subject to the suction of said pump and serving to regulate the flow of leakage fluid from said float chamber to said pump, and means on said valve cooperating with the leakage fluid for automatically turning said valve to thereby maintain a tight fit of the same upon its seat.

4. In a hydraulic servo system having a pump, a control valve supplied therefrom, and a reservoir as high as or higher than said control valve for receiving the normal discharge of said valve, a drain trap below said control valve having a float chamber separately connected for receiving leakage fluid from said control valve, said float chamber having a discharge opening connected to said reservoir and to the intake of said pump, a valve for closing said discharge opening, a vertically movable float within said float chamber subject to the buoyant action of the leakage fluid therein, said float being connected to said valve for actuating the latter.

5. In a hydraulic servo system having a pump, a control valve supplied therefrom, and a reservoir adapted in use to be as high as or higher than said control valve for receiving the normal liquid discharge of said valve, a drain trap below said control valve having a float chamber separately connected for receiving leakage fluid from said control valve by gravity flow, said float chamber having a discharge opening connected to the intake of said pump, a float within said float chamber subject to the buoyancy of the leakage fluid therein, a valve carried by said float for regulating the flow of leakage fluid through said discharge opening, spring means for urging said valve to closed position, said valve in its operation being subject to the conjoint action of said float, said spring means and the suction of said pump.

6. In combination with a hydraulic servo system having a pump, a control valve supplied therefrom and a supply reservoir adapted in use to be as high as or higher than said valve, a drain trap below said control valve connected for receiving leakage fluid by gravity flow from said control valve and for returning the same to said reservoir via said pump, said drain trap having a float chamber for receiving the leakage fluid, a valve for controlling the flow of fluid from said chamber back to said reservoir, and a float within said float chamber and subject to the buoyancy of said leakage fluid, said float being connected to said valve for actuating the latter and serving to cause the closing of said valve before all fluid is discharged from said float chamber, whereby air is kept out of the system.

SAMUEL C. ATKINS.
HAROLD E. SCOFIELD.